US009946681B1

(12) United States Patent
Jenkins et al.

(10) Patent No.: US 9,946,681 B1
(45) Date of Patent: Apr. 17, 2018

(54) HOST CONFIGURED MULTI SERIAL INTERFACE DEVICE

(71) Applicant: Western Digital Technologies, Inc., Irvine, CA (US)

(72) Inventors: Dean M. Jenkins, La Canada-Flintridge, CA (US); Dale Charles Main, La Canada-Flintridge, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 261 days.

(21) Appl. No.: 14/753,944

(22) Filed: Jun. 29, 2015

(51) Int. Cl.
*G06F 13/00* (2006.01)
*G06F 13/42* (2006.01)
*G06F 13/40* (2006.01)
*G06F 13/38* (2006.01)

(52) U.S. Cl.
CPC ........ *G06F 13/4282* (2013.01); *G06F 13/387* (2013.01); *G06F 13/4027* (2013.01); *G06F 13/4221* (2013.01)

(58) Field of Classification Search
None
See application file for complete search history.

(56) References Cited

U.S. PATENT DOCUMENTS

| 5,548,782 | A | * | 8/1996 | Michael | G06F 9/4411 |
| | | | | | 703/24 |
| 6,067,585 | A | * | 5/2000 | Hoang | H04L 41/0213 |
| | | | | | 370/401 |
| 6,708,251 | B1 | * | 3/2004 | Boyle | G06F 3/061 |
| | | | | | 386/294 |
| 7,111,121 | B2 | * | 9/2006 | Oishi | G06F 3/0619 |
| | | | | | 711/115 |
| 7,194,544 | B2 | * | 3/2007 | Natarajan | H04L 29/06 |
| | | | | | 709/201 |
| 7,237,054 | B1 | * | 6/2007 | Cain | G06F 3/0617 |
| | | | | | 710/107 |
| 7,254,650 | B2 | * | 8/2007 | Lin | G06K 7/0008 |
| | | | | | 710/10 |

(Continued)

FOREIGN PATENT DOCUMENTS

| CA | 2298322 A1 * | 9/2000 | .......... H04M 11/062 |
| CN | 105635146 A * | 6/2016 | |

(Continued)

OTHER PUBLICATIONS

'PCI Express Bus' by Interfacebus, Feb. 29, 2012.*

(Continued)

*Primary Examiner* — Steven Snyder
(74) *Attorney, Agent, or Firm* — Foley & Lardner LLP

(57) ABSTRACT

A dynamically configurable device including a connector configured to detect a first status of an interface selection mechanism, and a first Serializer De-serializer (SerDes) configured to drive a first selected interface from among a plurality of interfaces based on the first status. In response to the first status having a first state, the first selected interface is a first interface that causes the dynamically configurable device to present as a first type of device, and in response to the first status having a second state, the first selected interface is a second interface that causes the dynamically configurable device to present as a second type of device.

11 Claims, 4 Drawing Sheets

(56) References Cited

U.S. PATENT DOCUMENTS

| | | | | |
|---|---|---|---|---|
| 7,490,187 B2* | 2/2009 | Moll | | G06F 13/423 |
| | | | | 710/105 |
| 7,554,466 B1* | 6/2009 | Diab | | H04J 3/0685 |
| | | | | 341/100 |
| 7,624,216 B2* | 11/2009 | Yoshikawa | | G06F 13/387 |
| | | | | 710/301 |
| 7,664,902 B1* | 2/2010 | Chow | | G06F 12/1416 |
| | | | | 710/16 |
| 7,924,187 B2* | 4/2011 | Diab | | H04J 3/0685 |
| | | | | 341/100 |
| 7,987,308 B2* | 7/2011 | Jo | | G06F 13/387 |
| | | | | 365/63 |
| 8,073,985 B1* | 12/2011 | Ni | | G06F 12/1416 |
| | | | | 439/660 |
| 8,085,173 B2* | 12/2011 | Diab | | H04J 3/0685 |
| | | | | 341/100 |
| 8,301,822 B2* | 10/2012 | Pinto | | G06F 3/0607 |
| | | | | 710/305 |
| 8,301,831 B2* | 10/2012 | Ni | | G06F 12/1416 |
| | | | | 710/11 |
| 8,417,838 B2* | 4/2013 | Tamasi | | G06F 13/387 |
| | | | | 345/501 |
| 8,583,847 B2* | 11/2013 | Paul | | G06F 13/4072 |
| | | | | 710/303 |
| 8,694,709 B2* | 4/2014 | Loffink | | H01R 13/70 |
| | | | | 361/679.33 |
| 8,856,420 B2* | 10/2014 | Chandra | | G06F 13/385 |
| | | | | 710/315 |
| 9,158,722 B1* | 10/2015 | Jenkins | | G06F 13/385 |
| 9,164,862 B2* | 10/2015 | Paul | | G06F 13/4072 |
| 9,280,504 B2* | 3/2016 | Ben-Michael | | G06F 13/385 |
| 2004/0098530 A1* | 5/2004 | Earl | | G06F 13/385 |
| | | | | 710/315 |
| 2005/0182881 A1* | 8/2005 | Chou | | G06F 13/385 |
| | | | | 710/301 |
| 2007/0162624 A1* | 7/2007 | Tamasi | | G06F 13/387 |
| | | | | 710/8 |
| 2009/0261997 A1* | 10/2009 | Diab | | H04J 3/0685 |
| | | | | 341/100 |
| 2011/0156937 A1* | 6/2011 | Diab | | H04J 3/0685 |
| | | | | 341/100 |
| 2012/0151112 A1* | 6/2012 | Paul | | G06F 13/4072 |
| | | | | 710/304 |
| 2012/0166582 A1* | 6/2012 | Binder | | H04L 63/18 |
| | | | | 709/217 |
| 2014/0032791 A1* | 1/2014 | Paul | | G06F 13/4072 |
| | | | | 710/17 |
| 2014/0059266 A1* | 2/2014 | Ben-Michael | | G06F 13/385 |
| | | | | 710/313 |

FOREIGN PATENT DOCUMENTS

| | | | | |
|---|---|---|---|---|
| CN | 105824926 A | * | 8/2016 | |
| WO | WO 2005024557 A2 | * | 3/2005 | H04L 67/1097 |
| WO | WO 2017064660 A1 | * | 4/2017 | H04L 67/12 |

OTHER PUBLICATIONS

'PCIExpress 1x Connector Pin Out' Interfacebus, Feb. 27, 2012.*
'PCIExpress 4x Connector Pin Out' Interfacebus, Mar. 5, 2012.*
'PCIExpress 8x Connector Pin Out' Interfacebus, Mar. 5, 2012.*
'PCIExpress 16x Connector Pin Out' Interfacebus, Feb. 27, 2012.*
'PCI Express Base Specification Revision 1.0a' Apr. 15, 2003.*
John E. Maroney, U.S. Appl. No. 14/740,206, filed Jun. 15, 2015, 48 pages.

* cited by examiner

HOST CONFIGURED MULTI SERIAL INTERFACE DEVICE

BACKGROUND

Field

The current disclosure relates to a configurable device, including, without limitation, a dynamically configurable device configured to drive a selectable interface.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional devices have only one interface type. In order to use a different interface, a different device designed for that interface must be used. Different interfaces have different advantages and disadvantages, but a conventional device does not provide the flexibility of working with a plurality of different interfaces.

DETAILED DESCRIPTION

Figure 1:
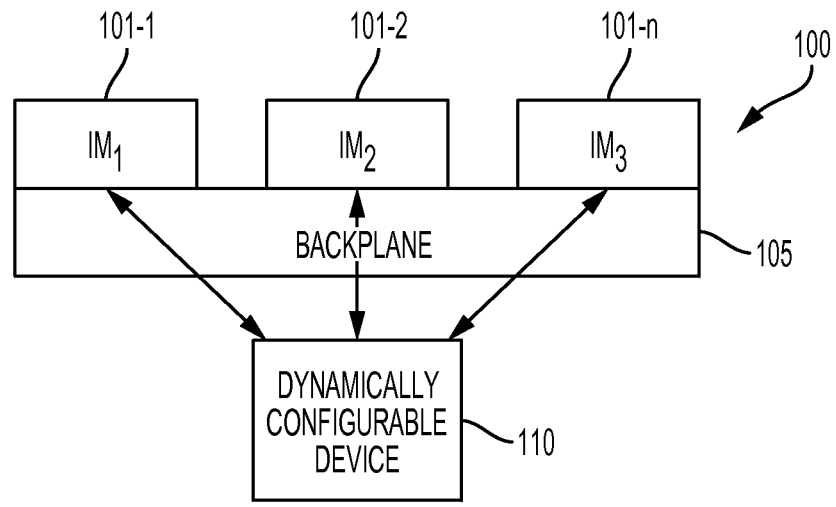
FIG. 1 is a block diagram illustrating a system including a dynamically configurable device, according to an embodiment.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

There are many high speed serial interfaces used to connect devices such as storage devices to host computers. However, as described above, a conventional device is designed to support only one of these interfaces. As systems migrate from one interface to the next this may result in a fully functional device becoming obsolete. Moreover, each type of high speed serial interface may have advantages over the others in certain use cases. However, limiting a device to a single interface type may limit the usefulness of that device in a particular system. In conventional systems, the popularity of any particular device interface may change over time. In a case where an interface is no longer commonly used, an otherwise functional device may become obsolete when a device that drives a more common interface replaces the otherwise functional device.

Some embodiments of the present disclosure are directed to dynamically configurable devices. The devices may be any type of device that plugs into a backplane and that may have different interfaces. For example, the dynamically configurable devices according to various embodiments include a data storage device, a SOC, a compute module, a DRAM processor, a memory module, a processor that is selectable to utilize the different interfaces, and the like. The interfaces selected are based on interface modules (e.g., switches) connected to the backplane. The interface modules may be on the backplane or be plugged into the backplane. This way, a passive backplane may be universal and customized with any combination of switches that transfer interface identification information to the dynamically configurable device. Of course, the switches may be fixed to the backplane as well. Furthermore, the dynamically configurable device may be connected with one or more interface modules by way of cabling. For propose of clarity, the disclosure refers to a backplane herein, but it is understood that a backplane and cabling are equally applicable.

Typical Serial Attached SCSI (SAS) or Serial ATA (SATA) devices only present as SAS or SATA, respectively. In contrast, dynamically configurable devices according to an embodiment described herein are self-configuring and are capable of presenting with any of a plurality of interfaces (e.g., Ethernet, Peripheral Component Interconnect express (PCIe), SAS, SATA, Gigabit Ethernet Media Access Controller (GeMAC), Serial Gigabit Media Independent Interface (SGMII), SATA express (SATAe), Universal Serial Bus (USB), Non-Volatile Memory express (NVMe), and the like). A dynamically configurable device according to an embodiment is self-configuring in that the system that it is plugged into determines what interface is selected and presented by the device.

The dynamically configurable/self-configuring device may operate in a single interface mode (e.g., an all PCIe backplane, an all Ethernet backplane, an all SATA backplane, etc.) and a mixed interface mode (e.g., a PCIe and GeMAC backplane, a SATA, PCIe, GeMAC backplane, etc). In the single interface mode, the dynamically configurable device may use one or more interface modules on the backplane that have the same type of interface. In the mixed interface mode, the dynamically configurable device may use two or more interface modules on the backplane that have different types of interfaces. For example, if the backplane to which the device is connected includes an Ethernet module and a PCIe module, the dynamically configurable device may be commanded to auto-configure so that one port runs in Ethernet mode and another port runs in PCIe mode. In another example, the dynamically configurable device self-configures using a test-and-select method, which is described in more detail below.

A dynamically configurable device according to an embodiment may be a device that utilizes a Serializer/Deserializer (SerDes). In response to the dynamically configurable device being connected with a backplane, the device is automatically configured so that the SerDes drives an interface that corresponds to an interface module (e.g., a switch) connected to or integrated with the backplane. The dynamically configurable device is capable of simultaneously supporting multiple interfaces. Simultaneously supporting multiple interfaces may allow a designer to take advantage of the positive aspects of at least two different interfaces. For example, the dynamically configurable device may be connected to a 1 Gbe SGMII interface module and an NVMe PCIe interface module and simultaneously take advantage of the fast NVMe interface for writes from the host and take advantage of the peer to peer capability of the 1 Gbe interface to make replicas of the data written on an adjacent device.

The dynamically configurable device may include a serial-attached SCSI (Small Computer System Interface) connector, also known as a SAS connector. A device with a SAS connector includes dual ports. The first port is connected to a first lane and provides a first differential pair for transmit (Tx) and a first differential pair for receive (Rx). The second port is connected to a second lane and provides a second differential pair for transmit (Tx) and a second differential pair for receive (Rx). Generally, the first port and the second port are redundant. In embodiments described herein, these redundant ports are re-appropriated so that different protocols, such as PCIe, SGMII, and the like, are selectably driven. Although the SAS electrical pinout is maintained, a dynamically changeable protocol is provided for at least one port and, in some embodiments, for each port. As described above, the same protocol may be driven from each port (e.g., a dual SGMII interface or a dual PCIe interface), and different protocols may be different driven from the ports (e.g., a PCIe interface and an SGMII interface). In addition, two SerDes may be used as a single wide PCIe interface with two PCIe lanes working together to form the interface.

For clarity the term "interface type" is used herein to describe both the transport layer related to the interface and the protocol related to the interface.

Figure 6:
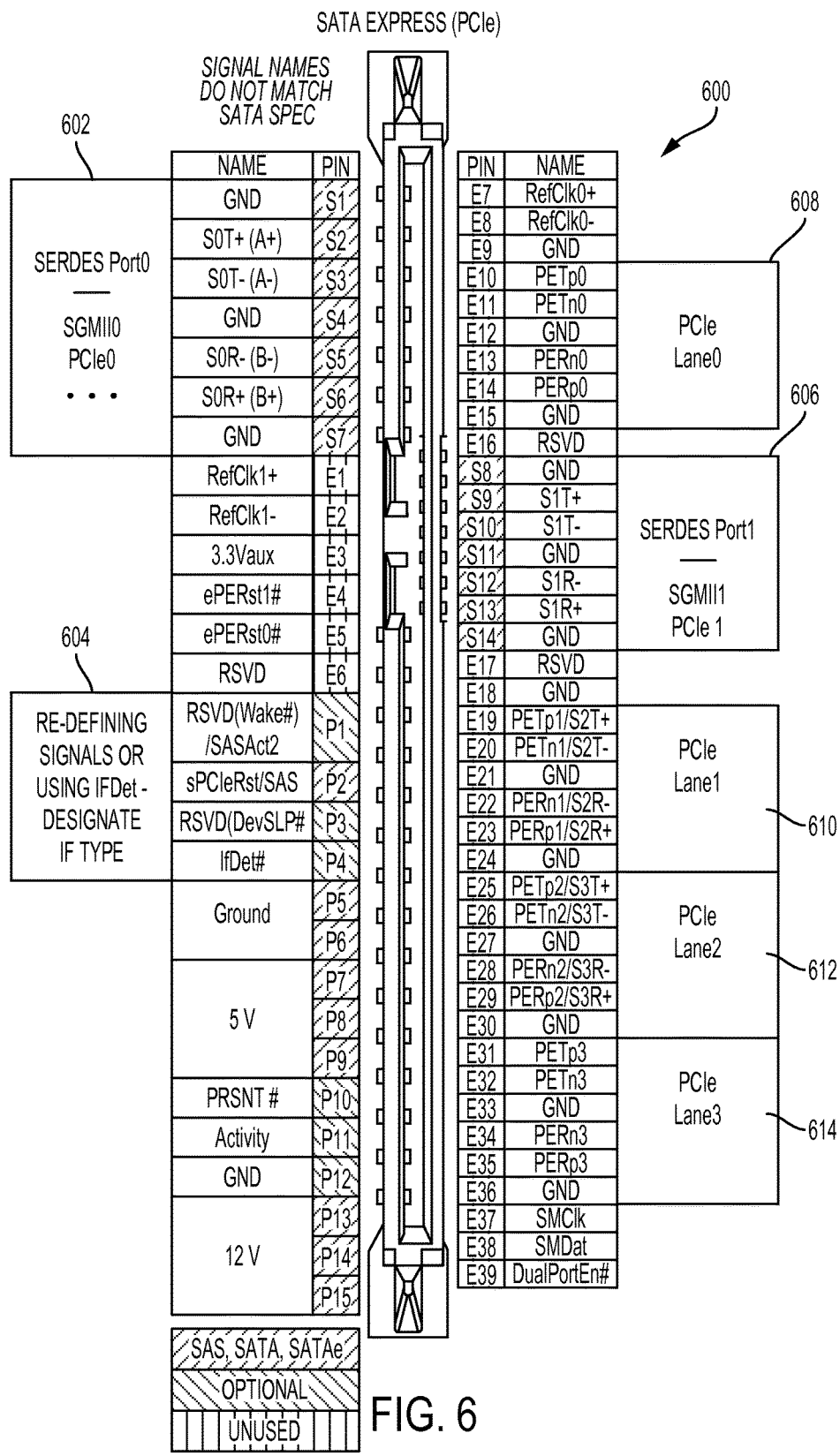
FIG. 6 illustrates a backplane connector, according to an embodiment.

FIG. 1 is a block diagram illustrating a system 100 according to an embodiment. The system 100 includes a dynamically configurable device 110 connected to n interface modules 101-1, 101-2, . . . , 101-n, where n is an integer that greater than or equal to 1, through a backplane 105. When it is not necessary to refer to a specific interface module, an interface module will be referred to generically as an interface module 101. The details of the backplane 105 are shown in FIG. 6 and are described in more detail below. The interface module 101 may be embodied as a switch, a port, a lane, a host bus adaptor, a SAS Expander Board (SEB), a Network Expander Board (NEB), and the like. The dynamically configurable device 110 and a host communicate via a protocol that is based on the interface module 101. There are various interface selection mechanisms that the dynamically configurable device 110 may use to determine which protocol to use in order to communicate with the host. The dynamically configurable device 110 detects a status of any one of these interface selection mechanisms in order to determine the proper protocol to use to establish communication between the host and the dynamically configurable device 110 via the interface module 101.

In one example, the interface selection mechanism is a test-and-select method. In the test-and-select method the dynamically configurable device 110 tries to communicate with the host via any number of successive protocols. In response to a communication attempt timing out after trying a first protocol, the dynamically configurable device 110 tries to communicate with the host using a second protocol and so on. Once the dynamically configurable device 110 and the host successfully communicate, the protocol that was used to establish the successful communication is set.

In another example, the interface selection mechanism is an identifier from the interface module 101. In this case, the dynamically configurable device 110 receives an identifier output from the interface module 101. The identifier tells the dynamically configurable device 110 which protocol(s) to use and causes the dynamically configurable device to present itself to the interface module as a device with the desired interface type(s). The identifier may be a side-band signal, an out-of-band signal, and the like, which is transmitted to the dynamically configurable device 110 through the backplane 105. For example, the identifier may be transmitted through the IF detect designate pin (or group of pins) on a SAS connector. The identifier may be a signal, a logical value, a packet, and the like, depending the particular design of the system. As described, there can be various interface selection mechanisms for identifying the proper interface type for establishing communication between the dynamically configurable device 110 and the host through the interface module 110. For the sake of illustration, the identifier mechanism is used throughout the remaining description. However, it is understood that other interface selection mechanisms are equally applicable to the remaining description.

By way of example, the interface module 101-1 may be a PCIe interface module and the interface module 101-2 may be an SGMII interface module. The PCIe interface module 101-1 transmits an identifier to the dynamically configurable device 110. The identifier identifies the PCIe interface module 101-1 as a PCIe interface transport layer and also selects the protocol running on top of the interface transport layer, e.g., PCIe/NVMe. The dynamically configurable device 110 according to an embodiment includes a connector configured to receive the identifier, and at least one SerDes (FIGS. 3 and 4) configured to drive a selected interface from among a plurality of interfaces based on the identifier received by the connector. In response to the identifier identifying a first interface (e.g., PCIe), the SerDes drives the first interface. Driving the first interface causes the dynamically configurable device to present as a first type of device (e.g., a PCIe device). In response to the identifier identifying a second interface, the first SerDes drives the second interface. Driving the second interface causes the dynamically configurable device to present as a second type of device. Similarly, the SGMII interface module 101-2 transmits an identifier, which identifies the SGMII interface module 101-2 as an SGMII interface, to the dynamically configurable device 110. Of course, the interface modules 101 are not limited to the interface modules described above and a module or switch for any interface may be used. In this way, a dynamically configurable device according to an embodiment may permit a system designer to take advantage of the positive aspects of at least two different interfaces simultaneously.

Figure 2:
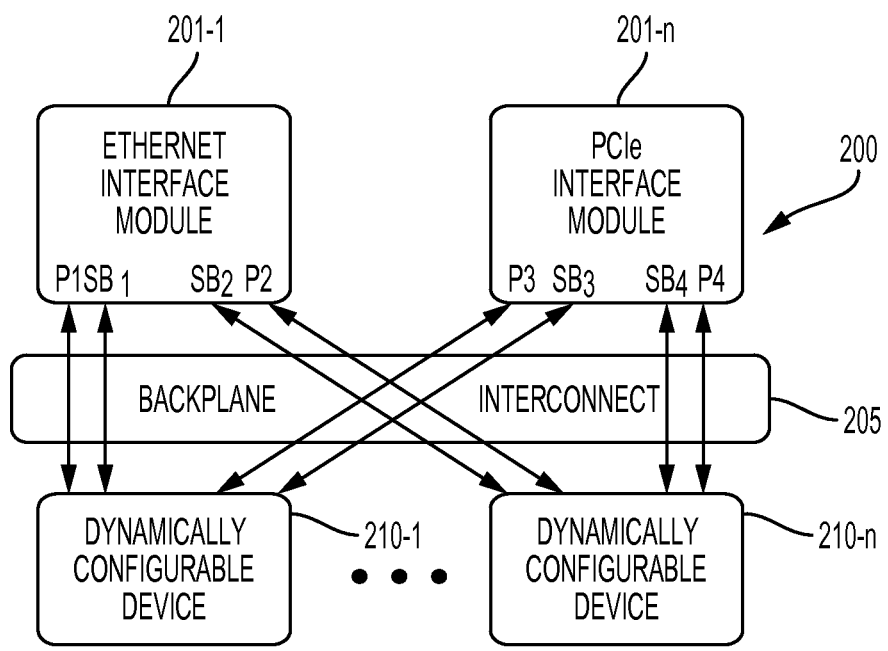
FIG. 2 is a block diagram illustrating a system including two dynamically configurable devices, each connected to two different interface types, according to an embodiment.

FIG. 2 shows an Ethernet interface module 201-1 and a PCIe interface module 201-n. The Ethernet interface module 201-1 includes a first port P1, a second port P2, and sideband interfaces SB1 and SB2. The PCIe interface module 201-n includes a third port P3 and a fourth port P4, and sideband interfaces SB3 and SB4. The first port P1 is connected to a first port of the dynamically configurable device 210-1 through the backplane interconnect 205. The second port P2 is connected to a first port of the dynamically configurable device 210-n through the backplane interconnect 205. The third port P3 is connected to a second port of the dynamically configurable device 210-1 through the backplane interconnect 205. The fourth port P4 is connected to a second port of the dynamically configurable device 210-n through the backplane interconnect 205. In response to the dynamically configurable device 210-1 being connected to the backplane interconnect 205, the Ethernet interface module 201-1 outputs an identifier from a sideband interface dedicated to the selection functionality or the test-and-select method commences; depending on the implementation. If the test-and-select method commences, then the dynamically configurable device self-configures as described above. On the other hand, if an identifier is output from an interface module, then the identifier causes the dynamically configurable device to automatically drive an Ethernet interface. Similarly, in response to the dynamically configurable device 210-1 being connected to the backplane interconnect 205, the PCIe interface module 201-n outputs an identifier from a sideband interface SB3. The identifier is received by the dynamically configurable device 210-1 and causes the dynamically configurable device to automatically drive a PCIe interface. A similar protocol is followed for each dynamically configurable device and interface module that is connected with the backplane 205.

Figure 3A:
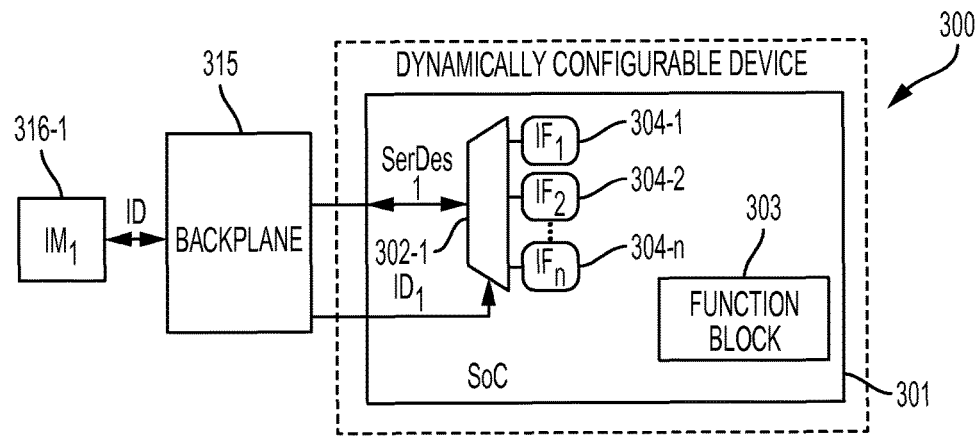
FIGS. 3A and 3B illustrate a dynamically configurable device in a system, according to an embodiment.

FIG. 3A shows a dynamically configurable device 300 according to an embodiment. The dynamically configurable device includes a system on a chip (SoC) 301 including a function block 303. The function block 303 defines the functionality of the dynamically configurable device (e.g., whether the dynamically configurable device is a storage device, a processor, a video card, a network card, and the like). The function block 303 may or may not be fully integrated with the SoC 301. The dynamically configurable device is connected to an interface module 316-1 through the backplane interconnect 315 or cabling as mentioned above. Of course, there may be more interface modules, but only one is shown for simplicity. The SoC 301 according to an embodiment includes a first selector module 302-1 (shown as a multiplexer (MUX)), which may be implemented using a MUX, a switch, and the like. The first selector module 302-1 includes a selector pin that receives an identifier $ID_1$ from the interface module 316-1. The identifier $ID_1$ may be a signal, a packet, and the like, that lets the dynamically configurable device know the interface type of the interface module 316-1.

For example, if the identifier $ID_1$ identifies the first interface 304-1 (e.g., the identifier $ID_1$ corresponds to the interface type of first interface 304-1), then the first selector module 302-1 drives the first interface 304-1 through a first SerDes. If the identifier $ID_1$ identifies the second interface 304-2 (e.g., the identifier $ID_1$ corresponds to the interface type of second interface 304-2), then the first selector module 302-1 drives the second interface 304-2 though the first SerDes, and so on. In this way, the MUX may include a selector that receives the identification signal, a plurality of inputs/outputs that are each associated with a different interface, and an output configured to output the selected interface from among the different interfaces to the SerDes.

Figure 4:
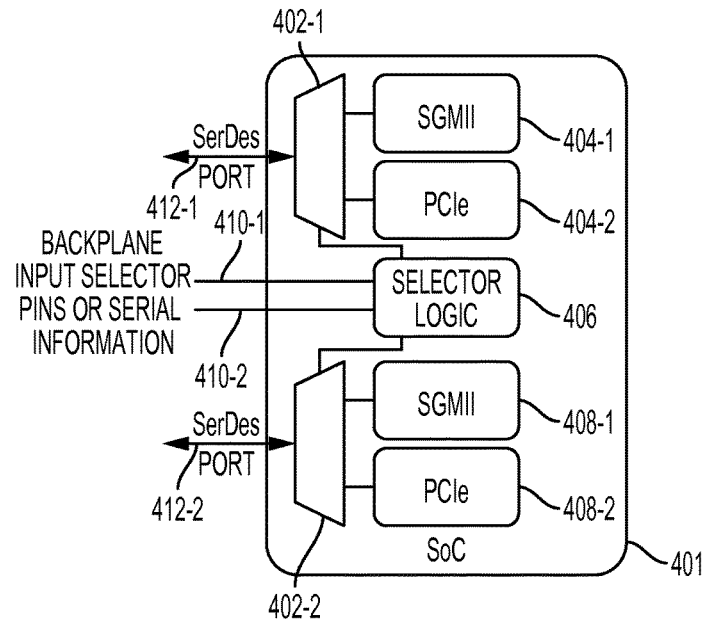
FIG. 4 illustrates a System-on-Chip (SoC), according to an embodiment.

The SoC may execute firmware associated with each of the interfaces, the MUX and the SerDes. The firmware may be stored on the SoC or external from the SoC. The SoC also includes multiple drivers (e.g., interfaces) behind a MUX. For example, as shown in FIG. 4 there is a SGMII interface 404-1 connected to the MUX 402-1 as well as a PCIe interface 404-2. Of course, other drivers could be used. For example, depending on how the SoC is set up different types of interfaces can be driven out of the SerDes port. In one embodiment, the SoC allows different interfaces to be driven out of the SerDes port.

As discussed above, in response to the dynamically configurable device being connected to the backplane, a selector module such as a MUX receives an identifier that lets the dynamically configurable device know the interface type of the interface module connected to or integrated with the backplane. According to an embodiment, the identifier is provided via a communications channel (e.g., a sideband channel) and tells the SoC to cause the MUX to drive the appropriate interface through the SerDes. As a result, in response to the dynamically configurable device (e.g., with a SAS connector) being plugged in or connected to the backplane or cabling, the dynamically configurable device may automatically determine and drive the appropriate interface.

This determination may be made using strapping pins within the interface module according to an embodiment. Alternatively, according to another embodiment, a hardware module, e.g., selector logic, may assist the MUX in selecting the proper interface to drive. Alternatively, the device itself may receive the identification information from the communication channel, and select its firmware based on the information from the interface module.

In a multiport backplane, depending on the interface module that is plugged in and in response to the dynamically configurable device being connected with the backplane or cabling, the dynamically configurable device either is commanded to configure itself according to an identifier or self-configures using the test-and-select method. In this way, one dynamically configurable device may be provided for a plurality of different interfaces. For example, the dynamically configurable device may automatically configure itself to present as a SAS device to the interface module when the dynamically configurable device is plugged into a SAS Host Bus Adaptor (HBA) on a PCIe backplane. Furthermore, the dynamically configurable device may automatically configure itself to present as a SATA device to the interface module when the dynamically configurable device is plugged into a SATA port on a backplane that is a server motherboard, etc.

Figure 3B:
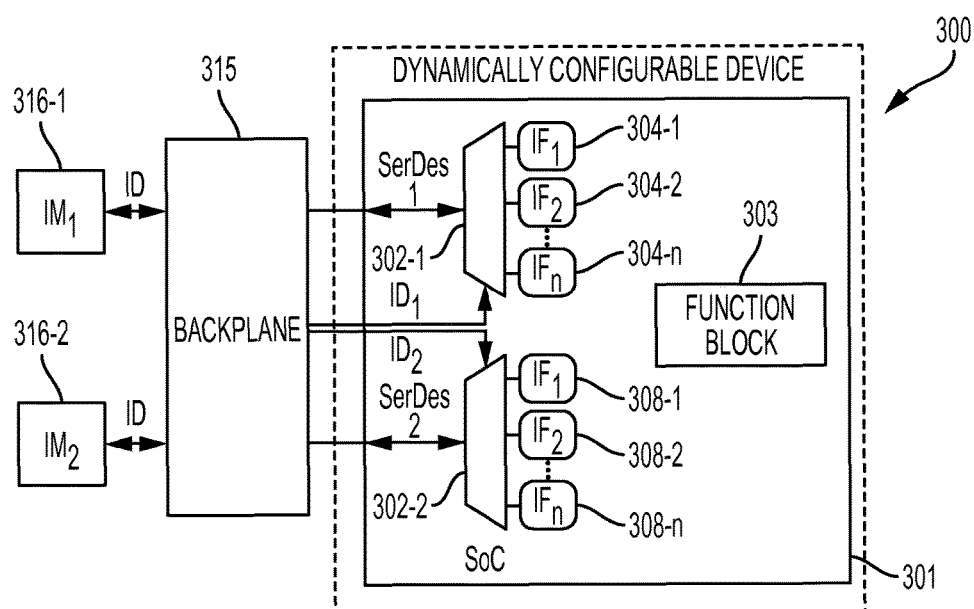

FIG. 3B shows the dynamically configurable device 300 according to an embodiment in more detail. Namely, FIG. 3B shows another interface module 316-2 connected to the dynamically configurable device through the backplane interconnect 315. The SoC 301 includes a second selector module 302-2, which may be implemented using a MUX, a switch, and the like. The second selector module 302-2 includes a selector pin that receives an identifier $ID_2$ from the interface module 316-2. The identifier $ID_2$ may be a signal, a packet, and the like that lets the dynamically configurable device know the interface type of the interface module 316-2. For example, if the identifier $ID_2$ identifies the first interface 308-1 (e.g., the identifier $ID_2$ corresponds to the interface type of first interface 308-1), then the second selector module 302-2 drives the first interface 308-1 through a second SerDes. If the identifier $ID_2$ identifies the second interface 308-2 (e.g., the identifier $ID_2$ corresponds to the interface type of second interface 308-2), then the second selector module 302-2 drives the second interface 308-2 though the second SerDes, and so on.

It should be noted that the interfaces that are selectable by the second selector module 302-2 do not necessarily have to be the same as the interfaces that are selectable by the first selector module 302-1. However, the interfaces that are selectable by the second selector module 302-2 may be the same as the interfaces that are selectable by the first selector module. For example, the first selected interface driven by the first SerDes may be selected from among a first interface 304-1, a second interface 304-2, . . . , and an nth interface 304-n. The second selected interface driven by the second SerDes may be selected from among a third interface 308-1, a fourth interface 308-2, . . . , and an nth interface 308-n. The first interface 304-1 may be the same as or different from the third interface 308-1. Similarly, the second interface 304-2 may be the same as or different from the fourth interface 308-2.

According to an embodiment, the interface module 316-1 may be an Ethernet switch that communicates with the dynamically configurable device using SGMII, and the interface module 316-2 may be a PCIe switch that communicates with the device 303 using PCIe.

Referring back to FIG. 2, the first selected interface may be Ethernet compliant and the second selected interface may be PCIe compliant. In this embodiment, the dynamically configurable device may be configured to communicate with a host via Ethernet (e.g., first selected interface), and transmit data to, or receive data from, another dynamically configurable device via PCIe (e.g., the second selected interface). This type of mixed-mode setup may be beneficial for a Ceph storage cluster. For instance, an Ethernet type of drive may run an application on the drive (e.g., an object storage daemon (OSD)) for Ceph. In a case where an Ethernet type of drive is running and a user also runs a map reduce operation on the drive (e.g., mapping all the objects and shuffling data between peers), it is desirable to shuffle the data between the peers rapidly. Although this shuffle may be done over Ethernet, there is a lot of overhead. By contrast, PCIe may be used as a back-type channel and the data can be moved very fast. Drive-to-Drive peer communication may be over PCIe, which is very fast with low overhead compared to Ethernet, according to an embodiment. In this way, the dynamically configurable device may utilize the most beneficial aspects of each interface type.

FIG. 4 shows a SoC 401 according to an embodiment that may replace the host interface of the SoC 301 illustrated in FIGS. 3A and 3B. This embodiment includes selector logic between the selector pin(s) and the backplane. This selector logic may process the identifier(s) to ascertain whether an interface that corresponds to the relevant interface module may be driven from the respective SerDes port. In response to determining that an interface that corresponds to the relevant interface module may be driven, the selector logic drives an interface/protocol selection to a processor so that firmware can further configure the port for the specified interface type and protocol. In response to determining that an interface that corresponds to the relevant interface module cannot be driven, the selector logic may cause the interface selector to output a null value or an error value. In this way, the dynamically configurable device may be automatically configured based on the interface module that is connected to the backplane. The selector logic may prevent the dynamically configurable device from driving an inappropriate interface (e.g., an interface that is not supported by the dynamically configurable device) that may damage the interface module.

Figure 5:
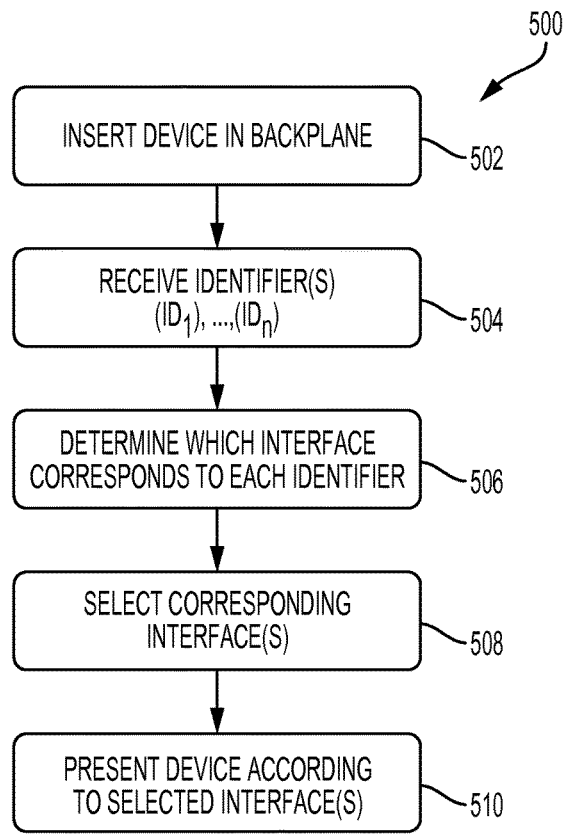
FIG. 5 is a flowchart illustrating a method for automatically configuring a dynamically configurable device, according to an embodiment.

FIG. 5 is a flowchart illustrating a method 500 that implements the features discussed above. At block 502, the dynamically configurable device is connected with the backplane. Next, at block 504, the dynamically configurable device detects the status of each of the interface modules connected to the backplane. In this example, the dynamically configurable device receives identifiers ($ID_1, \ldots, ID_n$) from each of the interface modules connected to the backplane. However, it is understood that the dynamically configurable device can detect the status of the interface modules using other interface selection mechanisms contemplated herein such as the test-and-select method. At block 506, the dynamically configurable device determines which interface corresponds to each identifier using at least one of the selector logic, selector pin, and device. Based on the determination at block 506, the method selects the corresponding interface(s) at block 508 and then presents the dynamically configurable device according to the selected interface(s) at block 510.

FIG. 6 shows a connector 600 that represents an example of a connector on the dynamically configurable device that plugs into the backplane. The connector 600 includes a SerDes port0 602, a SerDes port1 606, and pins whose signals can be redefined or the IFDet-designate pin that may be used to select the appropriate interface 604.

The identifier identifies the number of lanes that are needed (e.g., one lane, two lanes, or four lanes), the appropriate transport layer(s), the appropriate protocol(s), and in the case of PCIe which pins to use.

In a case where there is a single lane PCIe, the PCIe can be driven through any one of SerDes port0 602, SerDes port 1 606, PCIe lane0 608, PCIe lane1 610, PCIe lane2 612, PCIe lane3 614, and SerDes port0 602 and SerDes port1 606 as two single lane PCIe. In a case where there is a wide PCIe (e.g., 2 lanes, 4 lanes, or more lanes as needed), the PCIe can be driven through i) PCIe lane0 608, PCIe lane1 610, PCIe lane2 612, and PCIe lane3 614, ii) SerDes port0 602 and port1 606, vi) PCIe lane0 608 and PCIe lane1 610, vii) PCIe lane2 612 and PCIe lane3 614, and so on. In this way, a multi-configurable device that is both flexible and fully configurable may be realized. It is noted that there are many other configurations that are apparent from the disclosure above.

If PCIe is selected in an embodiment, there is an additional option to select the number and/or width of the PCIe lane configuration and the associated pin arrangement to support the selection.

Although the inventive concept has been described above with respect to the various embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of storage devices, one should not interpret that such specific order and/or arrangements are limited, or that all the operations performed and the components disclosed are needed to obtain a desired result.

What is claimed:

1. A dynamically configurable device including:
a connector configured to detect a first status of an interface selection mechanism, wherein the first status is detected based on a type of interface module associated with a system coupled to the connector;
a first Serializer De-serializer (SerDes) configured to drive a first selected interface from among a plurality of interfaces based on the first status; and
a second SerDes configured to drive a second selected interface from among the plurality of interfaces based on a second status of the interface selection mechanism, wherein the second status is detected based on a type of interface module associated with a system coupled to the connector,
wherein:
in response to the first status having a first state associated with a first type of interface module including at least one of a switch, a port, a lane, a host bus adaptor, and an expander board configured to communicate with a first device, the first selected interface is a first interface that causes the dynamically configurable device to present as a first type of device,
in response to the first status having a second state associated with a second type of interface module, the second type of interface module including at least one of a switch, a port, a lane, a host bus adaptor, and an expander board that is not included on the first type of interface module and configured to communicate with a second device, the second device being physically separate from the first device, the first selected interface is a second interface that causes the dynamically configurable device to present as a second type of device,
in response to the second status having the first state, the second selected interface is a third interface that causes the dynamically configurable device to present as a third type of device, and
in response to the second status having the second state, the second selected interface is a fourth interface that causes the dynamically configurable device to present as a fourth type of device, wherein the first selected interface is PCIe compliant and the second selected interface is Ethernet compliant, and the dynamically configurable device is further configured to:
communicate with a host via the second selected interface, and
transmit data to, or receive data from, another dynamically configurable device via the first selected interface.

2. The dynamically configurable device according to claim 1, further comprising a selector module including:
a first input associated with the first interface from among the plurality of interfaces,
a second input associated with the second interface from among the plurality of interfaces,
a selector configured to receive a signal of the interface selection mechanism reflecting the first status, and
an input/output (I/O) configured to output the first selected interface from among the plurality of interfaces to the first SerDes.

3. The dynamically configurable device according to claim 2, further comprising a system-on-chip (SoC), the SoC executing firmware associated with each of the plurality of interfaces, the selector module and the first SerDes.

4. The dynamically configurable device according to claim 1, wherein the plurality of interfaces include at least one from among Peripheral Component Interconnect express (PCIe), Serial Attached Small Computer System Interface (SAS), Serial Advanced Technology Attachment (SATA), Universal Serial Bus (USB), and Serial Gigabit Media Independent Interface (SGMII) compliant interfaces.

5. The dynamically configurable device according to claim 1, wherein the connector is further configured to be connected with one from among a backplane and cabling, and the first status is determined according to a type of interface module associated with the one from among the backplane and the cabling.

6. The dynamically configurable device according to claim 1, wherein the dynamically configurable device includes a storage device.

7. The dynamically configurable device according to claim 1, wherein the dynamically configurable device includes a compute module.

8. A system including:
a first interface module;
a dynamically configurable device configured to detect a first status of an interface selection mechanism based on an interface module type associated with the first interface module;
a backplane configured to be connected with the first interface module and the dynamically configurable device; and
a second interface module configured to be connected with the backplane;
wherein the dynamically configurable device includes:
a first Serializer De-serializer (SerDes) configured to drive a first selected interface from among a plurality of interfaces based on the first status, and wherein:
in response to the first status having a first state associated with a first type of interface module including at least one of a switch, a port, a lane, a host bus adaptor, and an expander board configured to communicate with a first device, the first selected interface is a first interface that causes the dynamically configurable device to present as a first type of device,
in response to the first status having a second state associated with a second type of interface module, the second type of interface module including at least one of a switch, a port, a lane, a host bus adaptor, and an expander board that is not included on the type first interface module and configured to communicate with a second device, the second device being physically separate from the first device, the first selected interface is a second interface that causes the dynamically configurable device to present as a second type of device,
the dynamically configurable device is further configured to detect a second status of the interface selection mechanism and further includes a second SerDes configured to drive a second selected interface from among the plurality of interfaces based on the second status, wherein the second status is detected based on a type of interface module associated with the second interface module,
wherein,
in response to the second status having the first state, the second selected interface is a third interface that causes the dynamically configurable device to present as a third type of device, and in response to the second status having the second state, the second selected interface is a fourth interface that causes the dynamically configurable device to present as a fourth type of device, wherein the first selected interface is Peripheral Component Interconnect Express (PCIe) compliant and the second selected interface is Ethernet compliant, and the dynamically configurable device is further configured to:

communicate with a host via the second selected interface, and transmit data to, or receive data from, another dynamically configurable device via the first selected interface.

9. The system according to claim 8, wherein in response to the first selected interface being PCIe compliant, the system selects a width of a PCIe lane configuration and an associated pin arrangement to support the selected width.

10. The system according to claim 8, wherein in response to the first selected interface being PCIe compliant, the system determines a lane configuration and an associated pin arrangement to support the lane configuration.

11. A method of configuring a dynamically configurable device, the method including:

detecting a first status of an interface selection mechanism with the dynamically configurable device;

detecting a second status of an interface selection mechanism with the dynamically configurable device, wherein the second status is detected based on a type of interface module associated with a system to which the dynamically configured device is coupled;

driving, using a first Serializer De-serializer (SerDes) of the dynamically configurable device, a first selected interface from among a plurality of interfaces based on the first status;

driving a second selected interface from among the plurality of interfaces based on the second status;

presenting the dynamically configurable device as a first type of device, in response to the first status having a first state that causes the first selected interface to be a first interface, the first state associated with a first type of interface module, the first interface module including at least one of a switch, a port, a lane, a host bus adaptor, and an expander board configured to communicate with a first device, and presenting the dynamically configurable device as a second type of device, in response to the first status having a second state that causes the first selected interface to be a second interface, the second state associated with a second type of interface module, the second type of interface module including at least one of a switch, a port, a lane, a host bus adaptor, and an expander board that is not included on the first type of interface module and configured to communicate with a second device, the second device being physically separate from the first device;

presenting the dynamically configurable device as a third type of device, in response to the second status having the first state, that causes the second selected interface to be a third interface, and presenting the dynamically configurable device as a fourth type of device, in response to the second status having the second state that causes the second selected interface to be a fourth interface, wherein the first selected interface is Peripheral Component Interconnect Express (PCIe) compliant and the second selected interface is Ethernet compliant, and the method further includes:

communicating with a host via the second selected interface; and transmitting data to, or receiving data from, another dynamically configurable device via the first selected interface.

* * * * *